(12) United States Patent
Brehmer et al.

(10) Patent No.: US 10,561,055 B2
(45) Date of Patent: Feb. 18, 2020

(54) DEVICE, SYSTEM, AND METHOD FOR SELECTING SEED VARIETIES AND FORECASTING AN OPTIMUM PLANTING TIME AND WINDOW FOR THE PLANTING OF SAID SEED

(71) Applicant: Bayer CropScience LP, Research Triangle Park, NC (US)

(72) Inventors: Jeff Brehmer, Lubbock, TX (US); Kenneth Melton, Lubbock, TX (US); Daniel Olivier, Lubbock, TX (US)

(73) Assignee: BASF Agro Trademarks GmbH (DE)

( * ) Notice: Subject to any disclaimer, the term of this patent is extended or adjusted under 35 U.S.C. 154(b) by 593 days.

(21) Appl. No.: 14/399,771

(22) PCT Filed: Mar. 13, 2013

(86) PCT No.: PCT/US2013/030698
§ 371 (c)(1),
(2) Date: Nov. 7, 2014

(87) PCT Pub. No.: WO2013/169349
PCT Pub. Date: Nov. 14, 2013

(65) Prior Publication Data
US 2015/0112595 A1 Apr. 23, 2015

Related U.S. Application Data

(60) Provisional application No. 61/644,075, filed on May 8, 2012.

(51) Int. Cl.
*A01B 79/00* (2006.01)
*G01W 1/06* (2006.01)
(Continued)

(52) U.S. Cl.
CPC ............. *A01B 79/005* (2013.01); *G01W 1/06* (2013.01); *G01W 1/10* (2013.01); *G06Q 50/02* (2013.01)

(58) Field of Classification Search
CPC ........ A01B 79/005; G01W 1/06; G01W 1/10; G06Q 50/02; G06Q 10/04; A01G 1/00; A01C 21/00
See application file for complete search history.

(56) References Cited

U.S. PATENT DOCUMENTS 4,445,788 A * 5/1984 Twersky .................. A01G 1/00
                                                      374/110
6,999,877 B1   2/2006 Dyer et al.
(Continued)

OTHER PUBLICATIONS articles.extension.org, How deep should I plant cotton seed, Nov. 29, 2007.*
(Continued)

*Primary Examiner* — Kyle R Quigley
(74) *Attorney, Agent, or Firm* — Drinker Biddle & Reath LLP

(57) ABSTRACT

A device is disclosed herein, said device for determining whether a day is suitable for planting a seed on a plot of land, said device comprising a microprocessor programmed to: (a) select at least one electronic data source containing meteorological data and/or soil temperature for the plot of land by a method comprising: (a1) determining the location of the plot of land; and (a2) selecting a data source providing local weather forecasting services and/or soil data services for the location of the plot of land; (b) electronically receive from the at least one electronic data source: (b1) meteorological data for the plot of land comprising a high surface air temperature and a low surface air temperature for each of the plurality of consecutive days; and (b2) at least one soil temperature for each of the plurality of consecutive days; and (c) select an alpha day within the plurality of consecutive days and determine whether it is suitable for planting the seed based on the meteorological data, the soil temperature, and a species of seed to be planted.

18 Claims, 3 Drawing Sheets

(51) Int. Cl.
*G01W 1/10* (2006.01)
*G06Q 50/02* (2012.01)

(56) References Cited

U.S. PATENT DOCUMENTS

| | | | |
|---|---|---|---|
| 7,184,892 B1 | 2/2007 | Dyer et al. | |
| 8,340,910 B1* | 12/2012 | Magro | G01N 33/24 702/2 |
| 2002/0050095 A1* | 5/2002 | McMullin | A01G 13/0268 47/17 |
| 2003/0009282 A1* | 1/2003 | Upadhyaya | A01B 79/005 701/409 |
| 2004/0039489 A1* | 2/2004 | Moore | A01G 25/16 700/284 |
| 2004/0080508 A1 | 4/2004 | Black | |
| 2006/0139037 A1* | 6/2006 | Hughes | G01N 33/246 324/696 |
| 2009/0259483 A1* | 10/2009 | Hendrickson | G06Q 10/06 705/315 |
| 2011/0054921 A1* | 3/2011 | Lynds | A01G 1/00 705/1.1 |
| 2011/0295575 A1 | 12/2011 | Levine et al. | |

OTHER PUBLICATIONS

Robertson et al., Cotton Physiology Today, vol. 13, No. 1, Apr. 2007 (Year: 2007).*
PCT International Search Report for PCT/US2013/030698, dated Jul. 10, 2013.
"Planting Planner App" Organic Life. (Feb. 10, 2012) p. 1-9.
Elmore, Roger, "Wait to Plant Corn with Forecast of Impending Cold Spell" Iowa State University (Apr. 12, 2011) p. 1-2.
Elmore, Roger, "Corn and Dry Soils at Planting, Looking Ahead to 2013-Part I" Iowa State University. (Feb. 11, 2013) p. 1-7.
Carpenter et al., "Comparative Environmental Impacts of Biotechnology-derived and Traditional Soybean, Corn, and Cotton Crops" United Soybean Board. (Jun. 2002) p. 1-189.
Abendroth et al., "Corn planting: Consider soil temperature and date" Iowa State University. (Apr. 2, 2007) p. 1-5.
Abendroth et al., "Updated Planting Date Recommendations for Iowa" Iowa State University. (Apr. 9, 2010) p. 1-5.
Pathak et al., "Soil Temperature: A Guide for Planting Agronomic and Horticulture Crops in Nebraska" NEBGUIDE. (Mar. 2012) G2122-G2125.
Robertson, et al., "Growth and Development—First 60 Days", Cotton Physiology Today, vol. 13, Issue 2, 2007, pp. 1-5.
Robertson, et al., "Planting and Replanting Decisions", Cotton Physiology Today, vol. 13, Issue 1, 2007, pp. 1-4.
Rodale Inc: "Organic Gardening Planting Planner", Apr. 15, 2012, XP002699071. http://web.archive.org/web/20120415053021/http://itunes.apple.com/us/app/organic-gardening-planting/id510043427?mt=8.
Araújo, Gleyce Kelly Dantas, "Determination and mapping of the beginning of the summer crops cycle in the state of Paraná through satellite imagery and rainfall data," Master Dissertation UNICAMP, Campiñas-SP, Jan. 2010. (English Translation of Abstract Attched).
"NDAWN Corn Growing Degree Days," North Dakota State University, https://web.archive.org/web/20110206081113/ http://ndawn.ndsu.nodak.edu/help-com-growing-degree-days.html, Feb. 6, 2011.

* cited by examiner

Fig. 1

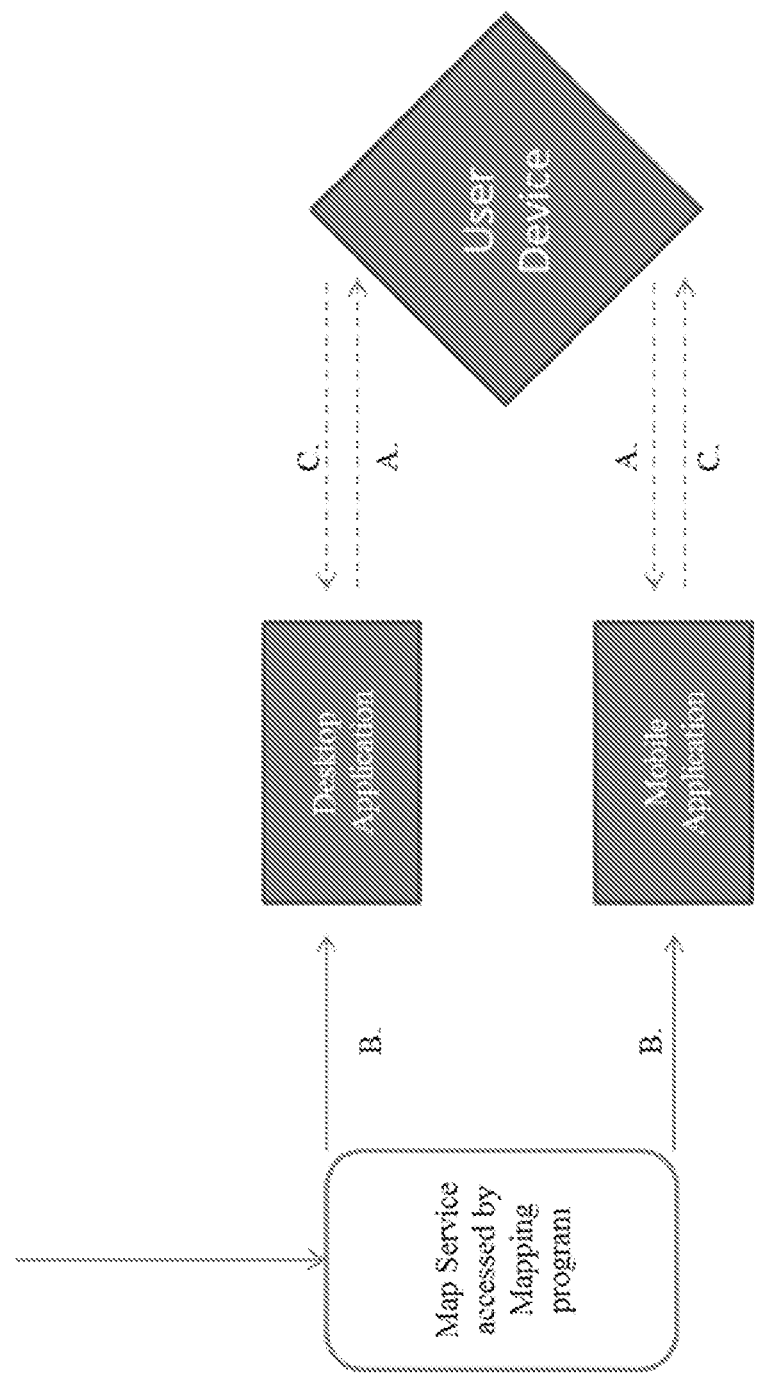

DEVICE, SYSTEM, AND METHOD FOR SELECTING SEED VARIETIES AND FORECASTING AN OPTIMUM PLANTING TIME AND WINDOW FOR THE PLANTING OF SAID SEED

CROSS-REFERENCE TO RELATED APPLICATIONS

This application is a § 371 U.S. National Stage of International Application No. PCT/US2013/30698, filed Mar. 13, 2013, which claims priority to U.S. Patent Application Ser. No. 61/644,075, filed May 8, 2012, the contents of which are herein incorporated by reference in their entirety.

FIELD OF INVENTION

The present invention relates to devices, systems, and methods for selecting seed varieties and predicting an optimal time for planting the seed.

BACKGROUND OF THE INVENTION

Many plants are sensitive to a number of environmental factors, including atmospheric and soil temperature, which is particularly acute at the early stages of plant development. As such, planting seeds too early can often lead to loss of young plants, requiring reseeding and thereby increasing expense and time expended for planting, reducing yield, and potentially delaying delivery of crops to market. It therefore is important that a farmer be reasonably certain that the seed is planted at a time when the risk of early plant damage can be avoided. This is especially important for cold-sensitive plants, such as cotton.

For many plants, the criteria for when a seed should be planted to avoid loss due to environmental conditions are well known. For example, the growth cycle of cotton has been well studied and the effect of various environmental factors on the stages of development is well understood. See, for example, Robertson et al., Cotton Physiology Today, Vol 13, No. 1, pages 1-5 (April 2007); and Robertson et al., Cotton Physiology Today, Vol 13, No. 2, pages 1-5 (May 2007). For example, cotton seeds require five consecutive days after planting with low temperatures above 50° F., mid-morning soil temperature at 68° F. or higher, and an accumulated DD60 value of 25 or greater for acceptable results.

However, the calculations often involve cumbersome mathematical formulas that are not easily understood by the layperson. Moreover, current systems for determining optimal planting times often omit critical factors or do not use up to date and accurate information.

A DD60 accumulation calculation program is available from the University of Arkansas. However, the program relies on 30 year norm temperatures to calculate future DD60 accumulations, which is of little relevance to predicting actual DD60 accumulations in the future. Moreover, the program does not have any way to integrate other relevant data in the report, such as soil temperature, ground saturation, and predicted precipitation. The program also requires the user to pick a planting date from which to calculate the DD60 accumulations, thereby necessitating either that several reports be generated or that individual five day DD60s be extrapolated by hand from a single report. For at least these reasons, the University of Arkansas program is of limited utility in predicting a best day on which to plant a seed.

The University of California further provides an online "Cotton Planting Forecast", which provides DD60 data for a limited number of locations over only the next 5 day period. However, the "Cotton Planting Forecast" does not have any options to customize the forecast for a specific location and does not incorporate either soil data or the minimum air temperature over the next five days into the calculation. For at least these reasons, the University of California program is of limited utility in predicting a best day on which to plant a seed.

It therefore would be valuable to have an automated device and method of determining the optimal timeframe in which a given seed variety may be planted that minimizes the measurements and calculations required by the farmer.

BRIEF SUMMARY OF THE INVENTION

A device is disclosed herein, said device for determining whether a day is suitable for planting a seed on a plot of land, said device comprising a microprocessor programmed to: (a) select at least one electronic data source containing meteorological data and/or soil temperature for the plot of land by a method comprising: (a1) determining the location of the plot of land; and (a2) selecting a data source providing local weather forecasting services and/or soil data services for the location of the plot of land; (b) electronically receive from the at least one electronic data source: (b1) meteorological data for the plot of land comprising a high surface air temperature and a low surface air temperature for each of the plurality of consecutive days; and (b2) at least one soil temperature for each of the plurality of consecutive days; and (c) select an alpha day within the plurality of consecutive days and determine whether it is suitable for planting the seed based on the meteorological data, the soil temperature, and a species of seed to be planted.

In another aspect, a system is provided comprising a device comprising a microprocessor as described herein operably linked to at least one component selected from the group consisting of: (a) a data source comprising meteorological data; (b) a data source comprising soil data; (c) a display device for displaying: (c1) a graphical interface as described herein, and/or (c2) a graphical representation as described herein; and (d) a data input device as described herein.

In another aspect, a computer-based method of predicting an optimal time to plant a seed is provided, said method comprising providing a device comprising a microprocessor as described herein, wherein said device: (a) obtains meteorological data for each of a plurality of consecutive days, wherein the meteorological data comprises at least one high surface air temperature and at least one low surface air temperature for each day of the plurality of consecutive days; (b) obtains soil data for a plot of land on which the seeds are to be planted, wherein the soil data comprises at least one temperature at least at one time point within the plurality of consecutive days; and (c) applies the meteorological data and the soil data to an algorithm for determining whether a time period within the plurality of days is suitable to plant a species of seed on the plot of land.

BRIEF DESCRIPTION OF THE DRAWINGS

FIG. 1 represents a tabular data display for reporting whether a given day is suitable for planting

FIG. 2B is an exemplary flow chart demonstrating acquisition and analysis of compiled data. A. A user accesses a program hosted locally on a user device, such as a desktop computer, or a mobile device, such as a tablet computer. The program hosted locally then communicates relevant user information (such as the location of the user and any data entered by the user) to a program for calculating a planting forecast. B. The program for calculating the planting forecast matches location data provided by the user device with a shapefile overlapping the location data, extracts the associated surface air temperature data and soil temperature data from the shape file and/or the data provided by the user, and calculates the planting forecast using an appropriate algorithm. C. A graphical representation of the planting forecast, such as that shown at FIG. 1, is then displayed on a display device operably linked to the user device.

DETAILED DESCRIPTION OF THE INVENTION

Figure 2A:
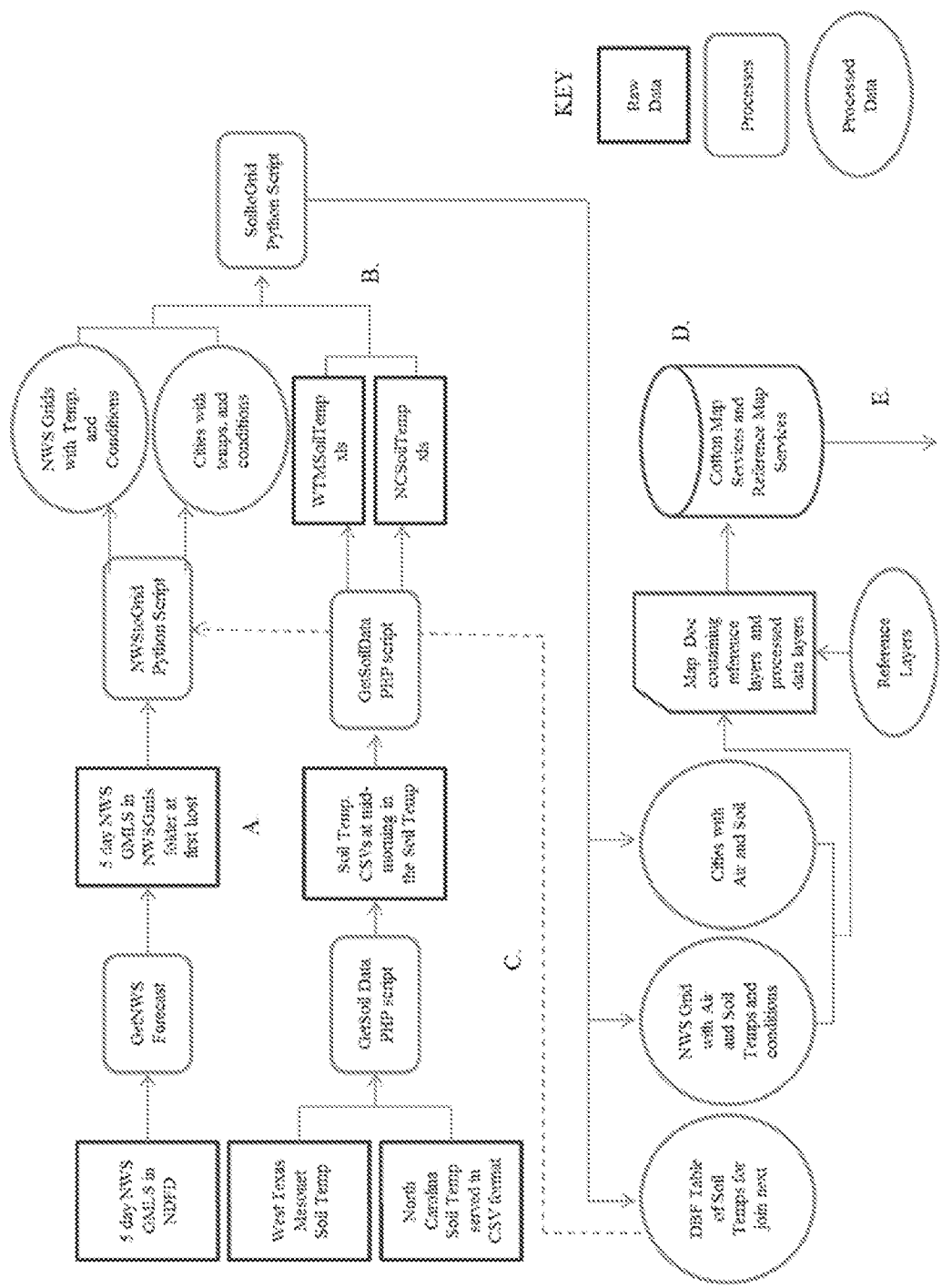
FIG. 2A is an exemplary flow chart showing compilation and organization of data for use with an application. A. A server collects GML files for the next five days from the National Weather Service and soil CSV files from the West Texas Mesonet and North Carolina Mesonet. B. If current day soil temperatures are unavailable, previous day's data is used. C. The GML files are converted to a single shapefile, the CSV files are converted to XLS format, and the shapefile is updated with soil temperature data from each mesonet area. D. A map service is generated from the collected data using a GIS model builder. E. The map service is communicated to an application in communication with the server.

Devices, systems, and methods are provided for calculating whether a day is suitable for planting a seed on a plot of land, wherein a microprocessor determines the location of the plot of land, automatically compiles meteorological data and/or soil data associated with the plot of land, and automatically determines whether the day is suitable for planting the seed based on the species of seed and the compiled meteorological data and/or soil data.

In an aspect, a device is provided comprising a microprocessor programmed to determining whether a day is suitable for planting a seed on a plot of land, said device comprising a microprocessor programmed to: (a) determining the location of the plot of land; (b) electronically receive: (b1) meteorological data comprising at least a high surface air temperature and a low surface air temperature for the location of the plot of land for each of the plurality of consecutive days; and (b2) at least one soil temperature for the location of the plot of land for at least one of the plurality of consecutive days; and (c) select an alpha day within the plurality of consecutive days and determine whether it is suitable for planting the seed based on the meteorological data, the soil temperature, and a species of seed to be planted.

By way of example and not limitation, the species of seed may be selected from cotton, soybean, corn, rice, wheat, and canola.

In another aspect, the seed may be a specific variety. By way of example and not limitation, a cotton variety may be selected from the various FIBERMAX™ varieties provided by Bayer CropScience LP (Research Triangle Park, N.C.), such as variety numbers FM 1944GLB2, FM 2989GLB2, FM 2011GT, FM 9250GL, FM 2484B2F; and the various STONEVILLE™ varieties provided by Bayer CropScience LP (Research Triangle Park, N.C.), such as variety numbers ST 4145LLB2, ST 5445LLB2, ST 5458B2RF, ST 5288B2F and ST 4288B2F.

As used herein, the phrase "meteorological data" refers to any data used in analyzing and predicting the weather in a specific location. By way of example and not limitation, meteorological data includes surface air temperature, atmospheric pressure, humidity, and precipitation. In an aspect, the meteorological data may comprise both actually measured data and forecasted meteorological data. For example, the meteorological data gathered by the microprocessor may comprise a mixture of actually measured and predicted high and low surface air temperatures and predicted high and low surface air temperatures. In another aspect, actual high and low surface air temperatures are collected for all days of the plurality of consecutive days for which actual readings are available, while predicted high and low temperatures are collected for any days for which actual high and low temperatures are unavailable. In an aspect, the predicted meteorological data is based at least in part on current atmospheric conditions.

As used herein, the phrase "soil data" refers to any data regarding the suitability of soil for planting a seed. By way of example and not limitation, soil data may comprise soil temperature, pH, moisture content, and/or nutrient content. Methods of measuring soil data are well known to a person or ordinary skill in the art.

In an aspect, the soil data comprises a soil temperature. Many services presently exist that provide soil temperatures, such as: the Soil Climate Analysis Network (SCAN) maintained by the Natural Resources Conservation Service; The Oklahoma Mesonet; the North Central River Forecast Center maintained by the National Weather Service. It is further contemplated that soil temperature may be directly measured on the plot of land on which the seed will be planted. For example, it is contemplated that a thermometer may be implanted on the plot of land on which the seed is to be planted. The soil temperature may then be read and manually entered into the device. In a further contemplated embodiment, the device may be configured to automatically collect actual soil temperatures for the plot of land by electronically communicating with the thermometer implanted on the plot of land or a representative of the land in which the seed is to be planted.

In an aspect, the microprocessor is configured to provide the user with an option to select the depth at which the soil temperature data is collected. For example, the user may be provided with the option to select one of a plurality of depths which is an acceptable standard for the determining the minimum soil temperature for the selected seed. The microprocessor may then adjust the acceptable minimum soil temperature based on the depth at which the reading is taken. As one example, soil temperatures are commonly measured for cotton seeds at a depth of 2", which corresponds to the approximate planting depth, or at a depth of 6", which corresponds to the approximate rooting depth. At 2", the minimum acceptable temperature is approximately 68° F. at mid-morning. At 6", the minimum acceptable temperature is approximately 60° F. at mid-morning. The microprocessor may be programmed as correlations between soil temperatures recorded at other depths become acceptable standards.

In an aspect, the microprocessor may be programmed to display, on a display device, a graphical interface comprising at least one data entry field. In an aspect, soil and/or seed data may be entered via the graphical interface generated by the microprocessor. In another aspect, a data entry field for entering the soil temperature data, the species of the seed to be planted, and/or the variety of seed to be planted may be provided. In a further aspect, the graphical interface may comprise a data entry field for entering data regarding the plot of land on which the seed is to be planted, including but not limited to: the address and/or ZIP code; map coordinates and/or global positioning system coordinates; geographic features of the land, such as the presence of lakes, ponds, or streams, altitude relative to sea level; and meteorological data specific for the plot of land, such as actual surface air temperature readings for the plot of land on which the seed is to be planted. In a further aspect, the graphical interface provides an option to select one of a plurality of data sources from which to obtain the meteorological data.

In an aspect, the graphical interface may provide at least one data entry field relevant to selecting a particular variety of seed to plant on the plot of land. As would be well understood by a person having ordinary skill in the art, most species of plant have a large number of different varieties that are optimized for particular conditions. In an aspect, the graphical interface may have a data entry screen for selecting particular characteristics of seed to optimize. The microprocessor may then access a database comprising different seed varieties having the indicated characteristics and determine which meets the requirements specified by the user. By way of example and not limitation, the conditions may be selected from the group consisting of: tolerance to pesticides; resistance to drought; suitability for specific soil types. In another aspect, the graphical interface may have a data entry screen for entering various characteristics of the plot of land on which the seed is to be planted, which the microprocessor may then use to calculate a variety of seed which is optimal for planting on the plot of land. By way of example and not limitation, the characteristics may be selected from: location of the land, such as by State and County, GPS coordinates, ZIP code, and/or map coordinates; pesticides used on the land; whether the land is irrigated; type of soil on the land; types and concentrations of pests found on the land, etc.

In an aspect, the microprocessor is adapted to communicate electronically with a source of actual and/or predicted meteorological and/or soil data, such as that available from national, regional, and local meteorological and agricultural services. In an aspect, the microprocessor is adapted to determine the location of the plot of land, find the closest electronically available data source to the plot of land, and automatically import actual and forecasted meteorological and/or soil data from that data source. By way example and not limitation, the data source may be a mesonet.

In an aspect, the device is configured to automatically compile the meteorological and soil data based on the location of the plot of land. For example, if the device is located near the plot of land or is portable, the device may comprise a present location apparatus, such as a receiver adapted to electronically communicate with a satellite-based navigation system (such as a global positioning system), or a radio transceiver adapted to electronically communicate with a cellular network. Alternatively, the device may be configured to electronically communicate with a separate device comprising such a present location apparatus located on or near the plot of land. In such an example, the microprocessor may use data collected from the satellite-based navigation system or the cellular network to determine the location of the plot of land, which may be used to select an electronic data source that provides local weather forecasting services and/or soil data services for the location determined by the microprocessor.

In an aspect, the computer processor determines an optimal seed variety to plant based on at least one characteristic of the plot of land selected from the group consisting of soil cation exchange capacity; soil texture; soil salinity; soil pH; soil nutrient level; pests and/or diseases associated with the land; crop residue level; irrigation level, capacity, and/or type; and/or any other factor which a person would consider important to selecting a variety of seed.

In an aspect, the computer processor determines an optimal seed variety to plant based on at least one seed treatment selected by the user, wherein the seed treatment is a chemical and/or biological pesticide treatment and/or a safener treatment. In an aspect, the computer processor determines an optimal seed variety to plant based on at least one seed variety characteristic selected by the user, the variety characteristics selected from maturity and a trait technology package, such as herbicide tolerance, insect tolerance, water use efficiency, nitrogen use efficiency, morphological characteristics, and end use quality traits, such as fiber quality or nutrient content.

Once the meteorological and soil data is gathered and, if appropriate, the seed type is selected, the microprocessor then uses the meteorological data and soil data to determine the suitability of an alpha day for planting the seed that has been selected. As used herein, the phrase "alpha day" shall refer to a day for which the determination is to be performed. In an aspect, the alpha day may be disposed within a plurality of consecutive days. In an exemplary aspect, the alpha day may be the first day of a five day period.

In an aspect, the microprocessor may be programmed to select one of several formulae for determining the suitability of planting a seed, based on a species of seed selected by the user. For example, the growing degree days formula ("GDD") is applied to a variety of different plant types to determine an optimal day for planting seeds. The GDD formula is shown below as Formula I:

$$GDD = \frac{(T_{max} + T_{min})}{2} - T_{base} \qquad \text{I}$$

wherein $T_{max}$ refers to the maximum surface air temperature for a day; $T_{min}$ refers to the minimum surface air temperature for a day; and $T_{base}$ refers to a base temperature commonly used for a given seed type. The GDD value is indicative of the total accumulated heat units above the base temperature for that particular day. A sum of the GDD values for a plurality of consecutive days ($\Sigma_{GDD}$) may then be calculated and evaluated to determine whether they exceed a pre-defined $\Sigma_{GDD}$ threshold set by the microprocessor for the seed being planted. As one example, a GDD using a base temperature of 60° F. (referred to as the DD60 formula) is commonly used to determine when to plant cotton seeds. $\Sigma_{GDD}$ thresholds using other $T_{bases}$ are well-known for numerous plants, and many more are expected to be developed in the future.

In an aspect, the seed is a cotton seed and the microprocessor is programmed to calculate an accumulated $\Sigma_{GDD}$ for at least a subset of the plurality of days using a $T_{base}$ of 60. In another aspect, the microprocessor calculates a $\Sigma_{GDD}$ for at least a portion of the plurality of days by a method comprising: (a) selecting an alpha day; (b) calculating the $\Sigma_{GDD}$ for a period of 5 consecutive days including and following the alpha day using a $T_{base}$ of 60; and (c) assigning the $\Sigma_{GDD}$ value to the alpha day. The $\Sigma_{GDD}$ value is then ranked by the microprocessor according to how suitable that period is for planting the seed that is selected. The process may be repeated for other 5 day periods among the plurality of days.

In a further aspect, the microprocessor may be programmed to have predetermined thresholds for other variables, such as minimum or maximum surface air temperatures, minimum or maximum soil temperatures, or minimum or maximum precipitation levels. If a day or plurality of days has a variable that does not meet these thresholds, the day is determined not to be suitable for planting. For example, cotton seeds are known to be sensitive to cold. As such, lower limits for soil temperature and/or surface air temperature may be set, and the microprocessor is programmed to indicate that a day is not suitable for planting a cotton seed if the surface air temperature and/or soil temperature does not fall below those thresholds. Exemplary thresholds for cotton could include: (1) the accumulated DD60 assigned to that day exceeds 25; (2) the low temperature over the five day period beginning with that day exceeds 50° F.; and (3) the mid-morning soil temperature at a 2" planting depth is at least 68° F. for each day among the five day period beginning on that day.

In an aspect, the microprocessor is further programmed to generate a graphical representation indicating whether the time frame is predicted to be suitable for planting the species of seed to be planted. By way of example and not limitation, the graphical representation may be a calendar view. In an aspect, the calendar may comprise a plurality of days color-coded with the suitability of that particular day for planting. By way of example and not limitation, three different color codes may be provided, corresponding to "Poor", "Marginal", and "Good" planting forecast. In another example, five color codes may be provided, corresponding to "Very Poor", "Poor", "Marginal", "Good", and "Very Good" planting forecast. Other examples of appropriate indications of suitability may be applied as desired. In another aspect, the calendar may comprise a plurality of days coded with text indicating the suitability of that day for planting. For example, a given calendar day may contain the phrase "Poor", "Marginal", or "Good" as an indication of suitability for planting. As another example, a given calendar day may contain the phrase "Very Poor", "Poor", "Marginal", "Good", or "Very Good" as an indication of suitability for planting. In a further aspect, a calendar day having a "Very Poor", "Poor", "Marginal", or other designation indicating a day is not suitable may further comprise a graphical or textual representation for why the day is not suitable. For example, the day may contain text indicating "Soil temperature too low", "GDD below threshold", "Minimum surface air temperature too low", or other explanation for why planting should not begin on that day. As another example, the day may be color-coded or pattern-coded with such an indication.

Figure 1:
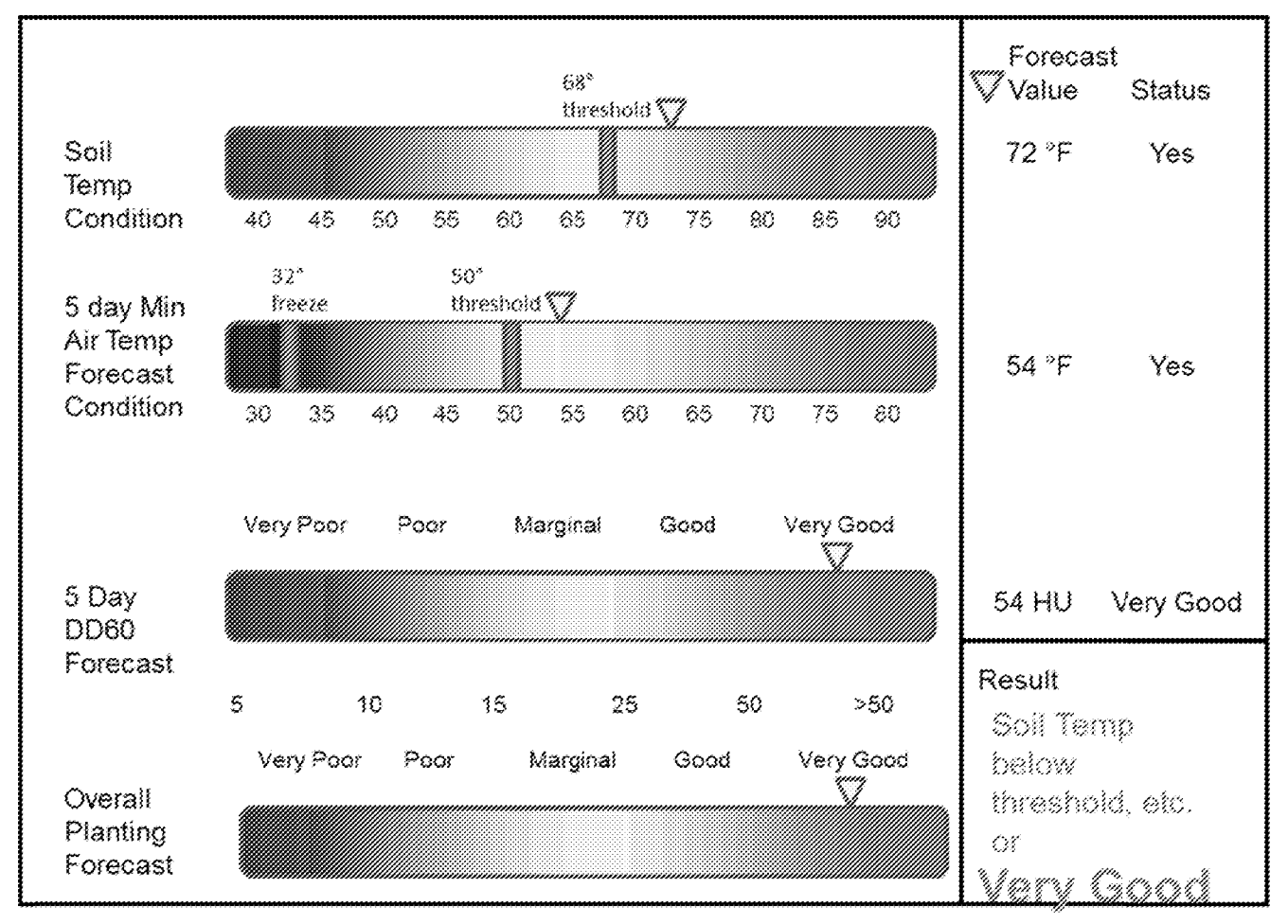

In another aspect, the graphical representation of the results may comprise a tabular data display for a particular day, comprising a textual and/or graphical representation of all data relied on in making the determination regarding the suitability of the day for planting. An exemplary tabular display is depicted at FIG. 1. By way of example and not limitation, the Tabular display may comprise a color-coded and/or textual indication of the soil temperature, surface air temperature, accumulated temperature above a threshold (such as DD50 or DD60 calculations); and/or overall planting forecast. In a further aspect, the tabular display may comprise graphical and/or textual indications of maximum or minimum thresholds for any of the factors considered in the calculation.

In an aspect, the microprocessor may be programmed to electronically communicate with a printer, which then prints the graphical representation of the results. In another aspect, the microprocessor is programmed to electronically communicate with a display device, on which the graphical representation of the results is displayed.

In an aspect, the device may comprise: (a) a microprocessor as described herein; and (b) means for electronically communicating with at least one of the following: (b1) a display device, such as: a computer monitor, television, PDA (such as a cellular phone, smartphone, tablet computer, or other handheld device with a screen), touch screen display, or other means of electronically displaying images; (b2) a data input device, such as: a keyboard, touch screen display, or a mouse; (b3) a data source comprising the meteorological data and/or soil data. By way of example and not limitation, the means for electronically communicating may be a modem or a device for communicating with a wireless or cellular network.

In another aspect, the device may be a smartphone or tablet computer.

In another aspect, a system for determining whether a time frame in the future is suitable for planting a seed is provided, the system comprising a device comprising a microprocessor as described herein operably linked to at least one component selected from: (a) a data source comprising the meteorological data; (b) a data source comprising the soil data; (c) a display device for displaying: (c1) a graphical interface as described herein, and/or (c2) a graphical representation as described herein; and (d) a data input device as described herein. In a further aspect, the display device of the system is disposed in a computer system.

In another aspect, a computer-based method of predicting an optimal time to plant a seed, said method comprising providing a device or system as described herein, wherein said device or system: (a) obtains meteorological data for each of a plurality of consecutive days, wherein the meteorological data comprises at least one high surface air temperature and at least one low surface air temperature for each day of the plurality of consecutive days; (b) obtains soil data for a plot of land on which the seeds are to be planted, wherein the soil data comprises at least one temperature at least at one time point within the plurality of consecutive days; and (c) applies the meteorological data and the soil data to an algorithm for determining whether a time period within the plurality of days is suitable to plant a species of seed on the plot of land.

EXAMPLES

A system is provided comprising a computer or mobile device (such as a tablet computer or smartphone) and a network of servers programmed to determine the location of the computer or mobile device, accumulate data from a mesonet most closely associated with the location of the tablet computer, and determine whether a day is suitable for planting cotton seeds.

A representative flow chart is displayed herein at FIG. 2, demonstrating gathering and processing of the surface air temperature and soil temperature data. A first server collects GML files for the next five days from the National Weather Service and soil CSV files from the West Texas Mesonet (maintained by Texas Tech University (Lubbock, Tex.)) and the North Carolina Mesonet (maintained by the State Climate Office of North Carolina and North Carolina State University (Raleigh, N.C.)). The GML files are converted to a single shapefile. The CSV files are converted to XLS format and the shapefile is updated with soil temperature data from each mesonet area. A map service is generated from the collected data using a GIS model builder, comprising seven map layers. The layers are set forth below in Table 1:

TABLE 1

| Name | Constant? | Description |
| --- | --- | --- |
| Mesonet Stations | Yes | Point shapefile displaying the location of Mesonet stations |
| Counties | Yes | Polygon shapefile displaying the locations of county boundaries |
| Major Cities | Yes | Point shapefile displaying locations of major cities |
| Cities | Yes | Point shapefile displaying locations of smaller towns that is updated with the same information as the NWSGridwTemps layer each time the GIS model is run. This layer can be used in a tabular forecast webpage. |
| Planting Forecast Coverage | Yes | Polygon shapefile displaying where air and soil conditions are available |
| NWS Forecast Coverage | Yes | Polygon shapefile displaying areas where the NWS air and DD60 conditions are available |
| NWS Grids with Air and Soil Temperatures and conditions | No | Polygon shapefile that is updated each time the GIS model is run. When this shapefile is queried in the application it displays the cotton planting forecast on the screen. |

The server network further hosts applications for converting the map service to a prediction for whether a given day is suitable for planting the seed.

The portion of the server network hosting this service may have the following additional programs installed: an Internet Information Services program; a program for editing and recompiling the application, such as Adobe FlashBuilder 4.0 or Microsoft Expressions, Frontpage, or Apptona (for mobile applications); data visualization applications, such as FusionCharts; a mapping program, such as ArcGIS API for Flex (ESRI, Redlands, Calif.).

Separate applications are provided, depending on whether the server network is accessed using a computer or a mobile device. If the network is accessed with a computer, all seven layers are accessed. If accessed by a mobile device, only the layer comprising NWS Grids with Air and Soil Temperatures and conditions is accessed. In either case, the application matches location data provided by the computer or mobile device (such as GPS information provided by a tablet computer) with a shapefile overlapping the location data, extracts the associated surface air temperature data and soil temperature data, and calculates a $\Sigma_{GDD}$ for the 5 day forecast using a $T_{base}$ of 60° F. Limit alerts are set to classify the day as having a very poor outlook for planting if the low surface air temperature falls below 50° F. for any day in the five day forecast or if the mid-morning soil temperature on the day of measurement is below 68° F. at a 2" measurement depth, or below 60° F. at 6" measurement depth. Further limit alerts are set at $\Sigma_{GDD}$ threshold values of 10, 15, 25, and 50. If the $\Sigma_{GDD}$ is 10 or less, the day is classified as having a very poor outlook for planting. If the $\Sigma_{GDD}$ is greater than 10, but not more than 15, the day is classified as a poor outlook for planting. If the $\Sigma_{GDD}$ is greater than 15, but not more than 25, the day is classified as having a marginal outlook for planting. If the $\Sigma_{GDD}$ is greater than 25, but not more than 50, the day is classified as having a good outlook for planting. If the $\Sigma_{GDD}$ is greater than 50, the day is classified as having a very good outlook for planting.

A report is then generated and transmitted to the computer or mobile device. An exemplary report is displayed at FIG. 1.

The invention claimed is:

1. A method of planting a cotton seed in a plot of land, the method comprising:

(a) predicting an optimal time to plant the cotton seed using a first device, wherein said first device:
  (i) determines automatically the location of the plot of land;
  (ii) obtains both closest actually measured and forecasted meteorological data based on the location of the plot of land for each of a plurality of consecutive days, wherein the meteorological data comprises at least one high surface air temperature and at least one low surface air temperature for each day of the plurality of consecutive days;
  (iii) selects one of a plurality of depths at which soil temperature data is collected;
  (iv) obtains closest soil data for the plot of land on which the seeds are to be planted, wherein the soil data comprises at least one soil temperature from at least one time point within the plurality of consecutive days;
    wherein the at least one soil temperature is obtained by using a thermometer implanted in the plot of land;
  (v) applies the meteorological data and the soil data to an algorithm for determining whether a time period within the plurality of days is suitable to plant a species of seed on the plot of land; and
(b) planting the cotton seed on a day predicted by the device to be suitable for planting the seed;
wherein the algorithm includes the steps of:
  (c1a) determining a GDD value for each of a predetermined number of consecutive days following an alpha day, according to Formula I:

$$GDD = \frac{(T_{max} + T_{min})}{2} - T_{base}, \quad (I)$$

wherein $T_{max}$ refers to the actual or predicted high surface air temperature for a day; $T_{min}$ refers to the actual or predicted low surface air temperature for a day; and $T_{base}$ refers to a base temperature of 60° F. associated with the cotton seed to be planted; and
  calculating the sum of GDD values over the predefined period of consecutive days ($\Sigma_{GDD}$), wherein the alpha day is determined to be suitable for planting the cotton seed when $\Sigma_{GDD}$ exceeds a predefined GDD threshold of 25;
  (c2a) determining the soil temperature for the alpha day, wherein the alpha day is determined to be suitable for planting the cotton seed when the soil temperature is equal to or greater than a predefined soil temperature threshold; and
  (c3a) determining the minimum surface air temperature for each day of the predefined period of consecutive days, wherein the alpha day is determined to be suitable for planting the seed when the minimum surface air temperature falls is equal to or greater than a predefined minimum surface air temperature threshold of 50° F. for any day of the predetermined number of consecutive days;
and wherein the first device generates a graphical representation indicating whether the alpha day is predicted to be suitable for planting the cotton seed to be planted,
wherein the graphical representation comprises a tabular data display comprising the soil temperature condition, surface air temperature forecast condition, GDD value forecast, and an overall planting forecast.

2. The method of claim 1, wherein the first device determines automatically the location of the plot of land by receiving location data from a second device located on or near the plot of land.

3. The method of claim 2, wherein the second device comprises a component of a satellite-based navigation system or a cellular network.

4. The method of claim 1, wherein the first device is programmed to determine the location of the plot of land based on location data entered by a user.

5. The method of claim 1, wherein the first device controls a wireless communication device or modem to obtain the high surface air temperature, and the low surface air temperature.

6. The method of claim 5 wherein the meteorological data is obtained from a plurality of mesonet sites.

7. The method of claim 5 wherein the meteorological data is obtained from a mesonet site; wherein the mesonet site is the closest representative of the location of the plot of land.

8. The method of claim 1, wherein the first device generates a graphical interface comprising at least one data entry field.

9. The method of claim 8, wherein soil temperature data is entered into the at least one data entry field of the first device.

10. The method of claim 8 wherein the cotton seed to be planted is entered into the at least one data entry field of the first device.

11. The method of claim 8 wherein the graphical interface of the first device further comprises a data entry field to select a variety of the species of cotton seed selected.

12. The method of claim 1, wherein one of the plurality of depths corresponds to the root depth of cotton seed to be planted, wherein the predefined soil temperature threshold is approximately 60° F. at mid-morning.

13. The method of claim 1, wherein one of the plurality of depths corresponds to the planting depth of the cotton seed to be planted, wherein the predefined soil temperature threshold is approximately 68° F. at mid-morning.

14. A method of planting a cotton seed in a plot of land, the method comprising:
(a) predicting an optimal time to plant the cotton seed using a first device, wherein said first device:
 (i) determines automatically the location of the plot of land;
 (ii) obtains both closest actually measured and forecasted meteorological data based on the location of the plot of land for each of a plurality of consecutive days, wherein the meteorological data comprises at least one high surface air temperature and at least one low surface air temperature for each day of the plurality of consecutive days;
 (iii) selects one of a plurality of depths at which soil temperature data is collected;
 (iv) obtains closest soil data for the plot of land on which the seeds are to be planted, wherein the soil data comprises at least one soil temperature from at least one time point within the plurality of consecutive days;
  wherein the at least one soil temperature is obtained by using a thermometer implanted in the plot of land;
 (v) applies the meteorological data and the soil data to an algorithm for determining whether a time period within the plurality of days is suitable to plant a species of seed on the plot of land;
and
(b) planting the cotton seed on a day predicted by the device to be suitable for planting the seed;
wherein the algorithm includes the steps of:
 (c1) determining a GDD value for each of a predetermined number of consecutive days following an alpha day, according to Formula I:

$$GDD = \frac{(T_{max} + T_{min})}{2} - T_{base},\qquad(I)$$

wherein $T_{max}$ refers to the actual or predicted high surface air temperature for a day; $T_{min}$ refers to the actual or predicted low surface air temperature for a day; and $T_{base}$ refers to a base temperature of 60° F. associated with the cotton seed to be planted; and
  calculating the sum of GDD values over the predefined period of consecutive days ($\Sigma_{GDD}$), wherein the alpha day is determined to not be suitable for planting the seed when $\Sigma_{GDD}$ does not exceed a predefined GDD threshold of 25;
 (c2) determining the soil temperature for the alpha day, wherein the alpha day is determined to not be suitable for planting the cotton seed when the soil temperature falls below a predefined soil temperature threshold; and
 (c3) determining the minimum surface air temperature for each day of the predefined period of consecutive days, wherein the alpha day is determined to not be suitable for planting the cotton seed when the minimum surface air temperature falls below a predefined minimum surface air temperature threshold of 50° F. for any day of the predetermined number of consecutive days;
and wherein the first device generates a graphical representation indicating whether the alpha day is predicted to be suitable for planting the cotton seed to be planted,
wherein the graphical representation comprises a tabular data display comprising the soil temperature condition, surface air temperature forecast condition, GDD value forecast, and an overall planting forecast.

15. The method of claim 14, wherein the first device determines automatically the location of the plot of land by receiving location data from a second device located on or near the plot of land.

16. The method of claim 14, wherein the first device controls a wireless communication device or modem to obtain the high surface air temperature, and the low surface air temperature.

17. The method of claim 16 wherein the meteorological data is obtained from a plurality of mesonet sites.

18. The method of claim 16 wherein the meteorological data is obtained from a mesonet site; wherein the mesonet site is the closest representative of the location of the plot of land.

* * * * *